(12) United States Patent
Janakiraman et al.

(10) Patent No.: US 7,269,751 B2
(45) Date of Patent: Sep. 11, 2007

(54) SUPPLYING POWER TO AT LEAST ONE ELECTRICAL DEVICE BASED ON AN EFFICIENT OPERATING POINT OF A POWER SUPPLY

(75) Inventors: Gopalakrishnan Janakiraman, Sunnyvale, CA (US); Keith Istvan Farkas, San Carlos, CA (US); Chandrakant D. Patel, Fremont, CA (US); Cullen Edwin Bash, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 10/628,291

(22) Filed: Jul. 29, 2003

(65) Prior Publication Data

US 2005/0028017 A1    Feb. 3, 2005

(51) Int. Cl.
*G06F 1/26* (2006.01)
(52) U.S. Cl. .................................. 713/323
(58) Field of Classification Search ............. 713/323
See application file for complete search history.

(56) References Cited

U.S. PATENT DOCUMENTS

| | | | | |
|---|---|---|---|---|
| 4,794,272 A | * | 12/1988 | Bavaro et al. | 307/66 |
| 5,483,656 A | * | 1/1996 | Oprescu et al. | 713/320 |
| 5,629,608 A | * | 5/1997 | Budelman | 323/268 |
| 6,121,695 A | * | 9/2000 | Loh | 307/64 |
| 6,473,608 B1 | * | 10/2002 | Lehr et al. | 455/402 |
| 6,609,204 B1 | * | 8/2003 | Olarig et al. | 726/35 |
| 6,700,351 B2 | * | 3/2004 | Blair et al. | 320/125 |
| 6,813,897 B1 | * | 11/2004 | Bash et al. | 62/175 |
| 2001/0024109 A1 | * | 9/2001 | Sobkow et al. | 323/225 |
| 2002/0004912 A1 | * | 1/2002 | Fung | 713/300 |
| 2002/0044026 A1 | * | 4/2002 | Coffey | 333/24 R |
| 2004/0010725 A1 | * | 1/2004 | Chan | 713/300 |
| 2005/0052085 A1 | * | 3/2005 | Chang et al. | 307/66 |

\* cited by examiner

*Primary Examiner*—Rehana Perveen
*Assistant Examiner*—Fahmida Rahman (57) ABSTRACT

A primary power supply and a secondary power supply are operable to supply power to at least one electrical device. A power demand of the electrical device is determined, and an efficient operating point for the primary power supply is determined. One or more of the primary power supply and the secondary power supply are used to supply power to the electrical device based on whether the primary power supply operating at an efficient operating point is operable to meet the power demand of the at least one electrical device.

27 Claims, 7 Drawing Sheets

SUPPLYING POWER TO AT LEAST ONE ELECTRICAL DEVICE BASED ON AN EFFICIENT OPERATING POINT OF A POWER SUPPLY

FIELD OF THE INVENTION

This invention relates generally to power systems. More particularly, the invention relates to supplying power to at least one electrical device based on the efficiency of a power supply.

BACKGROUND OF THE INVENTION

Power supplies for computer systems are typically designed to meet the maximum power demand of the load, such as the computer systems receiving power from the power supplies, and for redundancy. While these factors are important in power supply design, energy efficiency is an equally important factor that is usually not given the same weight as other factors when designing power supplies.

Figure 5:
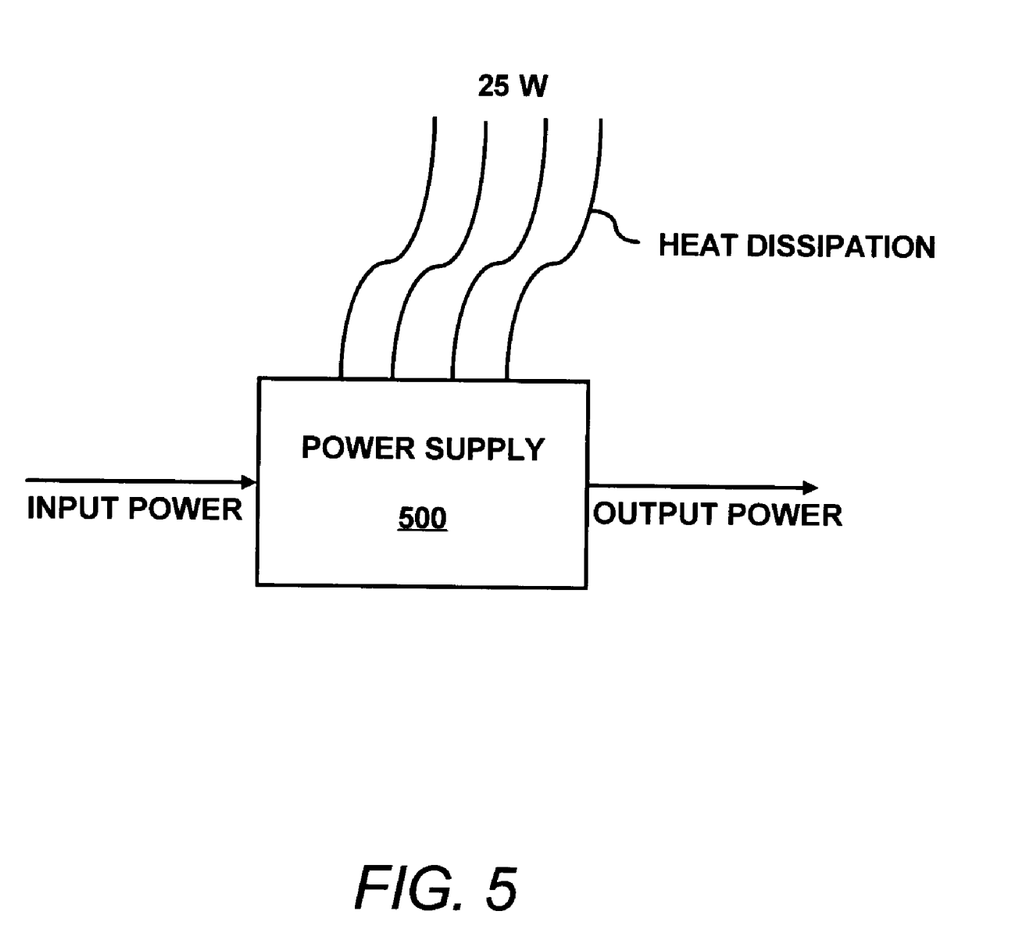
FIG. 5 illustrates a block diagram of a conventional power supply.
Figure 6:
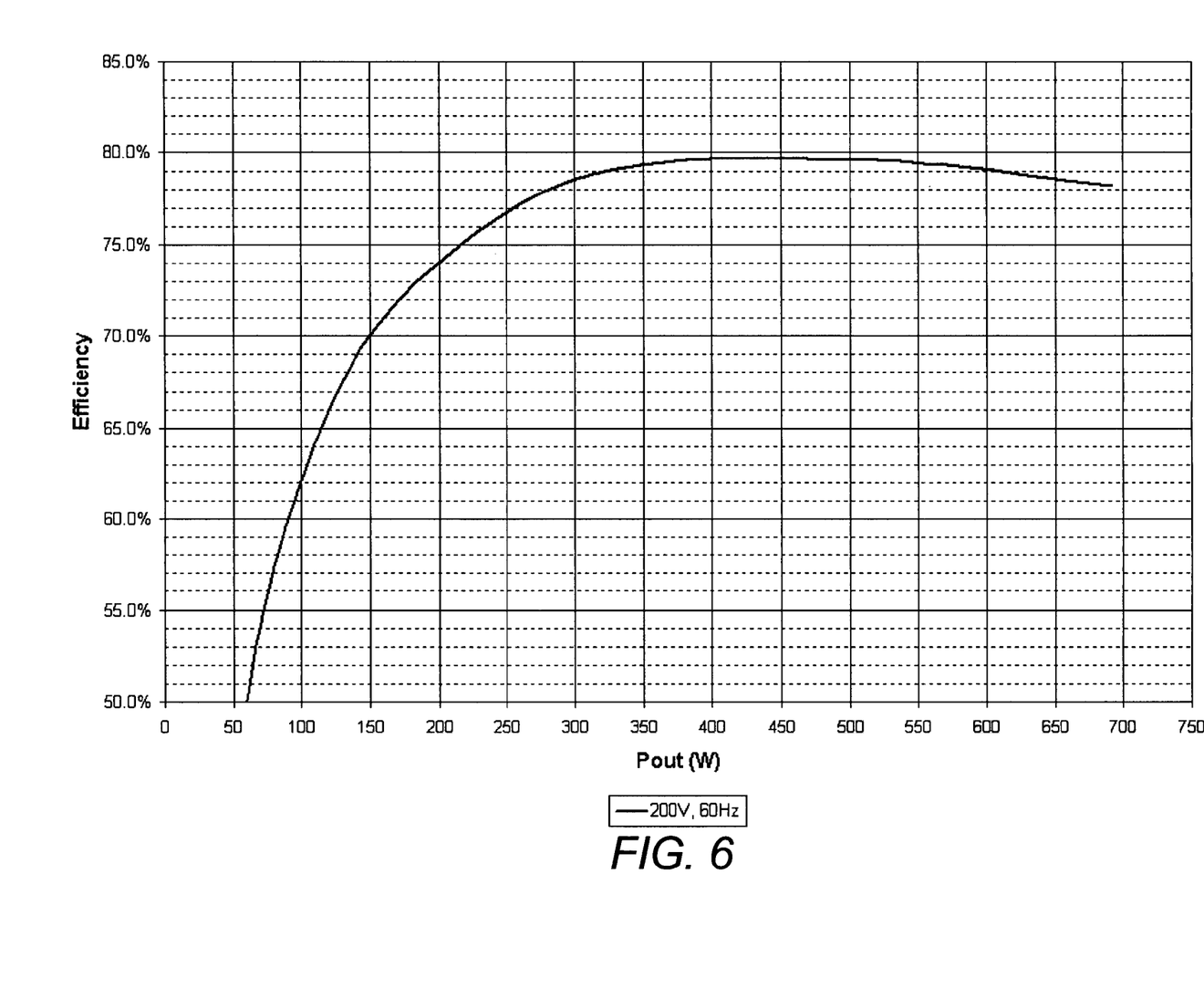
FIG. 6 illustrates an efficiency curve for a power supply.

FIG. 5 illustrates a conventional power supply 500 modeled as a black box with power entering the black box (input power) and conditioned power (output power) exiting the black box. Conditioning may include alternating current (A/C) or direct current (D/C) conversions (e.g., AC/AC, AC/DC, DC/DC, etc.), and the like. Ideally, there would be no losses between the input power and the output power. However, in reality, losses occur during the conditioning, typically as heat dissipation. Efficiency of a power supply may be measured as the ratio of output power over input power. For example, if 100 Watts (W) are input to the power supply 500 and 75 W of conditioned power exits the power supply 500, the power supply has 75% efficiency. 25 W of heat may be dissipated by the power supply 500. The efficiency of a power supply is usually provided by a manufacturer, but may also be measured, FIG. 6 illustrates an exemplary efficiency curve for an AC/DC power supply input power at 200 Volts (V) and 60 Hertz (Hz). The efficiency curve of FIG. 6 may be provided by the power supply manufacturer or determined through power measurements. Referring to the efficiency curve of FIG. 6, the power supply is approximately most efficient (e.g., approximately 80%) with a power output between 400 W and 450 W. Conventional power systems for computer systems use at least two power supplies for redundancy, whereby each power supply is operable to meet the power demand of the computer systems unilaterally in case of failure of one of the power supplies. However, for the majority of their operation, both power supplies are operational and are usually designed to split the load. Therefore, if the computer systems demand 400 W, the power supplies each only operate at approximately 74% efficiency (e.g., each power supply supplying an output power of approximately 200 W at 74% efficiency per power supply). If three power supplies are used, each of the power supplies only operates at approximately 64% efficiency. Therefore, conventional power systems for computer systems typically sacrifice efficiency for other factors (e.g., redundancy), which leads to increased energy costs.

Power factor is another important characteristic typically considered when designing a power supply since the power factor impacts the sizing of the electrical wires and equipment that supply energy to the power supply and the cost of electricity. Power factor is the ratio of real power over apparent power (see Equation 1).

$$\text{Power Factor} = \text{real power}/\text{apparent power} \quad \text{Equation (1)}$$

Power factor is based on the type of load on the power supply. A purely resistive load has a power factor of 1, which is ideal, because the real power is equal to the apparent power. However, for non-purely resistive loads, real power is less than apparent power, leading to power factors less than 1. As the difference between apparent and real power increases (i.e., with smaller power factors), more current must be generated by the power source in order to deliver a specific amount of real power to the load. For example, in a system with a power factor of 0.5, to deliver 100 W of real power (10 Amps at 10 Volts) requires the power source to provide 20 Amps at 10 Volts. In a load with a sinusoidal voltage and current, the real power is equal to the product of the RMS input voltage (V), input current (I), and $\cos(\Phi)$, where $\cos(\Phi)$ is the phase angle between the voltage and the current. $\cos(\Phi)$ is the power factor.

The difference between apparent and real power impacts the cost of the electrical equipment that provides power to a computer system power supply, because all the electrical components upstream of the power supply must be sized for a higher current. In addition, because all components dissipate some heat when current passes through them, higher currents translate into greater power wastage. To offset this cost and the cost of the greater power wastage, electrical utilities charge, in general, more for electricity provided to lower power factor loads.

Typically, power supplies for computer systems may have a power factor between 0.6 and 0.8. A poor power factor may be the result of a large amount of reactive power caused by an inductive load. The output power of a power supply can be modeled based on power factor and efficiency (see Equation 2).

$$\text{Output Power} = \text{efficiency} * \text{power factor} * \text{apparent power} \quad \text{Equation (2)}$$

Figure 7:
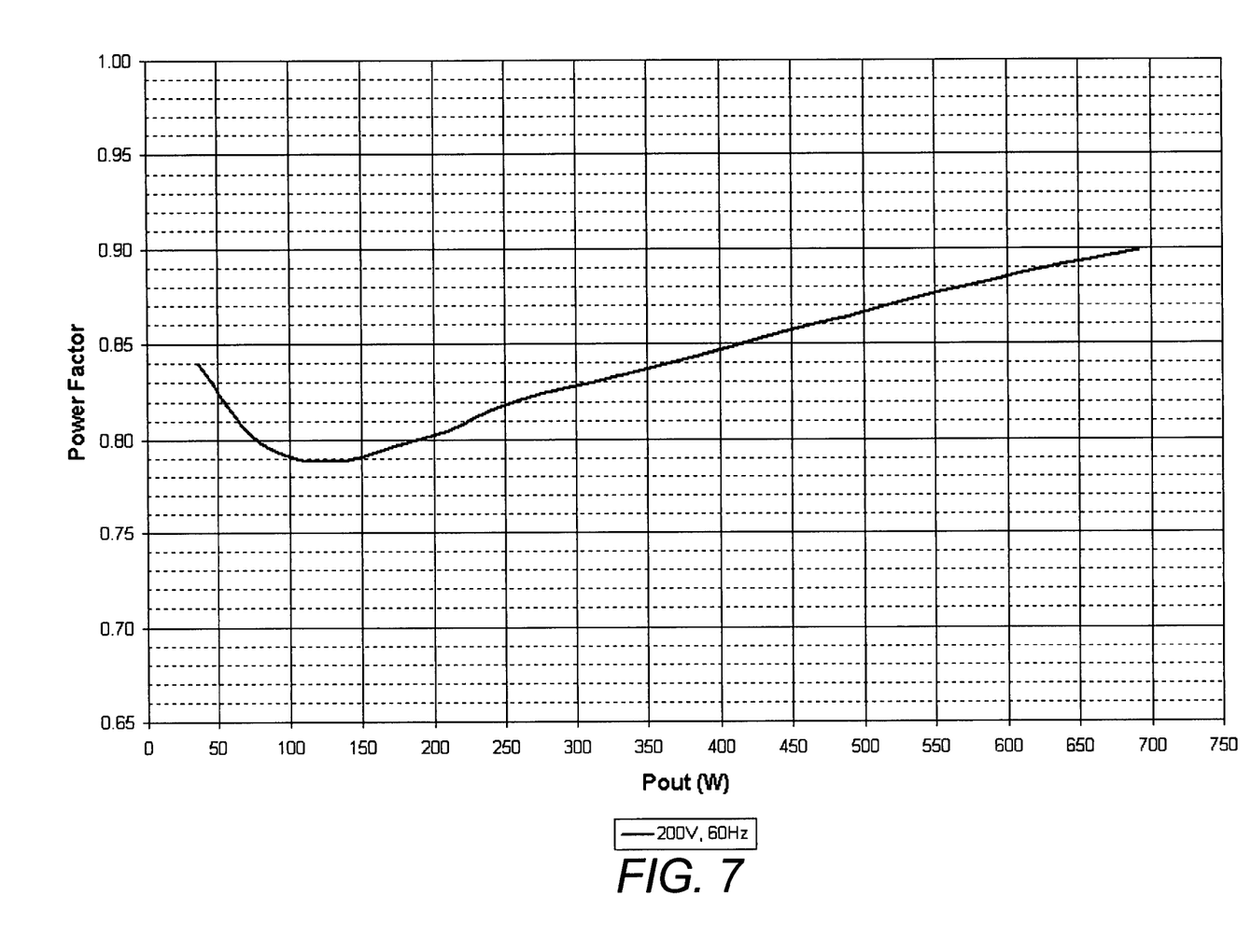
FIG. 7 illustrates a power factor curve for a power supply.

FIG. 7 illustrates an exemplary power factor curve for the power supply having the efficiency curve shown in FIG. 6. The power factor curve shown in FIG. 7 may be provided by a manufacturer (e.g., based on a predetermined load) or may be calculated from power measurements. Based on this power factor curve, a higher power factor is achieved generally as output power of the power supply is increased. Power factor correction circuits are generally used to improve factor. However, power factor is typically not considered when optimizing the efficiency of a power supply or power system.

SUMMARY OF THE INVENTION

According to an embodiment, a method of supplying power to at least one electrical device comprises determining a power demand of the at least one electrical device; determining an efficient operating point for a primary power supply supplying power to the at least one electrical device; and supplying power to meet the power demand of the at least one electrical device using one or more of the primary power supply operating at the efficient operating point and a secondary power supply.

According to another embodiment, a power system comprises a first power supply and a second power supply operable to supply power to at least one electrical device. A power delivery control device is connected to the first power supply and the second power supply. The power delivery control device substantially maintains the first power supply at an efficient operating point by controlling an output power of the first power supply and an output power of the second power supply to meet the power demand of the at least one electrical device.

According to another embodiment, an apparatus controls the power output from a first and second power supply based on an efficiency of the first power supply. The first and second power supply provide power to at least one electrical device. The apparatus comprises at least one power measuring circuit measuring a power demand of the at least one electrical device, a memory storing at least one threshold associated with an efficient operating point of the first power supply, and a circuit comparing the power demand of the at least one electrical device to the at least one threshold and controlling an output power of the first power supply to substantially maintain the first power supply at the efficient operating point.

According to another embodiment, a system comprises means for determining a power demand of at least one electrical device means. The system further comprises a primary power supply means and a secondary power supply means for supplying power to meet the power demand of the at least one electrical device means, and a means for controlling an output power of the primary power supply means and the secondary power supply means based on whether the primary power supply means is operating at an efficient operating point.

BRIEF DESCRIPTION OF THE DRAWINGS

The present invention is illustrated by way of example and not limitation in the accompanying figures in which like numeral references refer to like elements, and wherein.

DETAILED DESCRIPTION OF EMBODIMENTS

According to an embodiment, at least two power supplies supply power to at least one computer system. A first power supply of the at least two power supplies is substantially maintained at an efficient operating point when supplying power to the computer systems. When the efficiency of the first power supply varies from the efficient operating point, the load of the first power supply is changed to allow the first power supply to return to the efficient operating point.

In one embodiment, the load on the first supply is changed by using a second power supply to supply power to the computer systems. For example, when the power demand of the computer systems exceeds the output power of the first power supply operating at the efficient operating point, then the second power supply additionally supplies power to the computer systems (i.e., the second power supply shares the load). Generally, the amount of power demand exceeding the power output of the first power supply operating at the efficient operating point is supplied by the second power supply. Power demand (also referred to as power consumption) may be measured by conventional power measuring circuits or devices.

In another embodiment, the load on the first power supply is changed by migrating the workload of a computer system. For example, if the first power supply needs to increase its output power to be at the efficient operating point, the workload of one or more of the computer systems may be increased by migrating applications to the computer systems from other computer systems, which may not receive power from the first power supply. Thereby, the power demand of the computer systems is increased. If the output power of the first power supply needs to be decreased to achieve the efficient operating point, the workload of the computer systems may be decreased to decrease power consumption. For example, an application executing on one of the computer systems may be migrated to another computer system receiving power from a different power supply or to another computer system that is more energy efficient and receiving power from the same power supply.

The efficient operating point of the first power supply may be based on output power and/or a power factor for the first power supply, where the first power supply is substantially most efficient. For example, a power efficiency curve may be used to identify one or more output powers where the first power supply is most efficient. Referring to FIG. 6, for example, the power supply having this efficiency curve is most efficient outputting power between 400 W and 450 W (i.e., a range of output powers). If the output power falls below 400 W or is greater than 450 W, then the power supply is determined to be operating outside its efficient operating point. Also, the range may be based on output powers where the power supply is substantially most efficient. Referring to the power efficiency curve in FIG. 6, for example, the range of output powers where the power supply is substantially most efficient may include 350 W to 550 W. The load on the power supply may be increased or decreased to achieve a power output within the range (i.e., operating the power supply at the efficient operating point). The efficient operating point may be a particular value, e.g., 450 W, instead of a range.

Also, power factor may be considered when optimizing the system to reduce costs, A poor power factor typically requires a load to consume more input power (e.g., provided by a utility) to compensate for the difference between apparent power and real power. As the difference between apparent and real power increases (i.e., with smaller power factors), more current must be generated by the power source in order to deliver a specific amount of real power to the load, resulting in increased costs. In addition, lower power factors tend to increase the cost of electrical equipment, which may need to be sized for higher current.

FIG. 7 illustrates a power factor curve for the power supply having the efficiency curve shown in FIG. 6. The power factor is highest at an output power of approximately 680 W and a power factor of approximately 0.89. Therefore, based on the power factor curve of FIG. 7, energy costs may be minimized by maintaining a high output power (e.g., approximately 680 W or within a range of 420-680 W. The power factor for the power supply may be periodically or substantially continuously calculated. A power factor threshold may be used to determine when the power supply is operating outside its most efficient operating point. The threshold, for example, may be set at 0.85 (i.e., approximately 420 W output power). Therefore, when the power factor falls below 0.85, the load on the power supply may be increased. The efficient operating point may also be based on a range of power factors where the power supply is substantially most efficient (e.g., a power factor range of 0.85-0.89).

The efficient operating point of a power supply may also be based on the efficiency of power system components upstream from the power supply. For example, the power supply may be connected to a power distribution unit (PDU), which also has an efficiency curve. Also, the power supply may be most efficient at an output power of 100 W. However, the PDU may require a larger load to reach its efficient operating point. Then, the efficient operating point of the power supply may be increased (e.g., 120 W output power) to allow the PDU to achieve its efficient operating point. Therefore, the overall efficiency of the power system may be increased.

Also, the efficient operating point may be based on energy costs. For example, if the cost of electricity is significantly high when compared to the cost of electricity generated from alternative energy sources (e.g., fuel cells, wind power, solar power, etc.), then a second power supply connected to the lower cost energy source may service a substantial portion of the load. For example, if the cost of electricity is 30 cents per kilowatt hour (kwh) (e.g., supplied via a primary power source from a power utility) and the cost of electricity is 20 cents per kwh from an alternative energy source (e.g., supplied via a secondary power source), the efficient operating point, in terms of output power of the primary power supply, is set relatively low. Therefore, the majority of the power demand (e.g., power demand of one or more computer systems receiving power from the primary power supply and the secondary power supply) is met by the secondary power supply. Alternatively, if the cost of electricity from the alternative energy source exceeds the cost of electricity, from a power utility, then the efficient operating point of the primary power supply, in terms of power output, may be increased. When basing efficiency on the cost of electricity, power factor may be considered. Generally, operating the primary power supply or the secondary power supply at an output power that results in a higher power factor reduces the amount of input power needed to generate a certain output power, such as described with respect to equation 2 above. Therefore, energy costs may be reduced by operating the primary or secondary power supply at a higher power factor.

Figure 1:
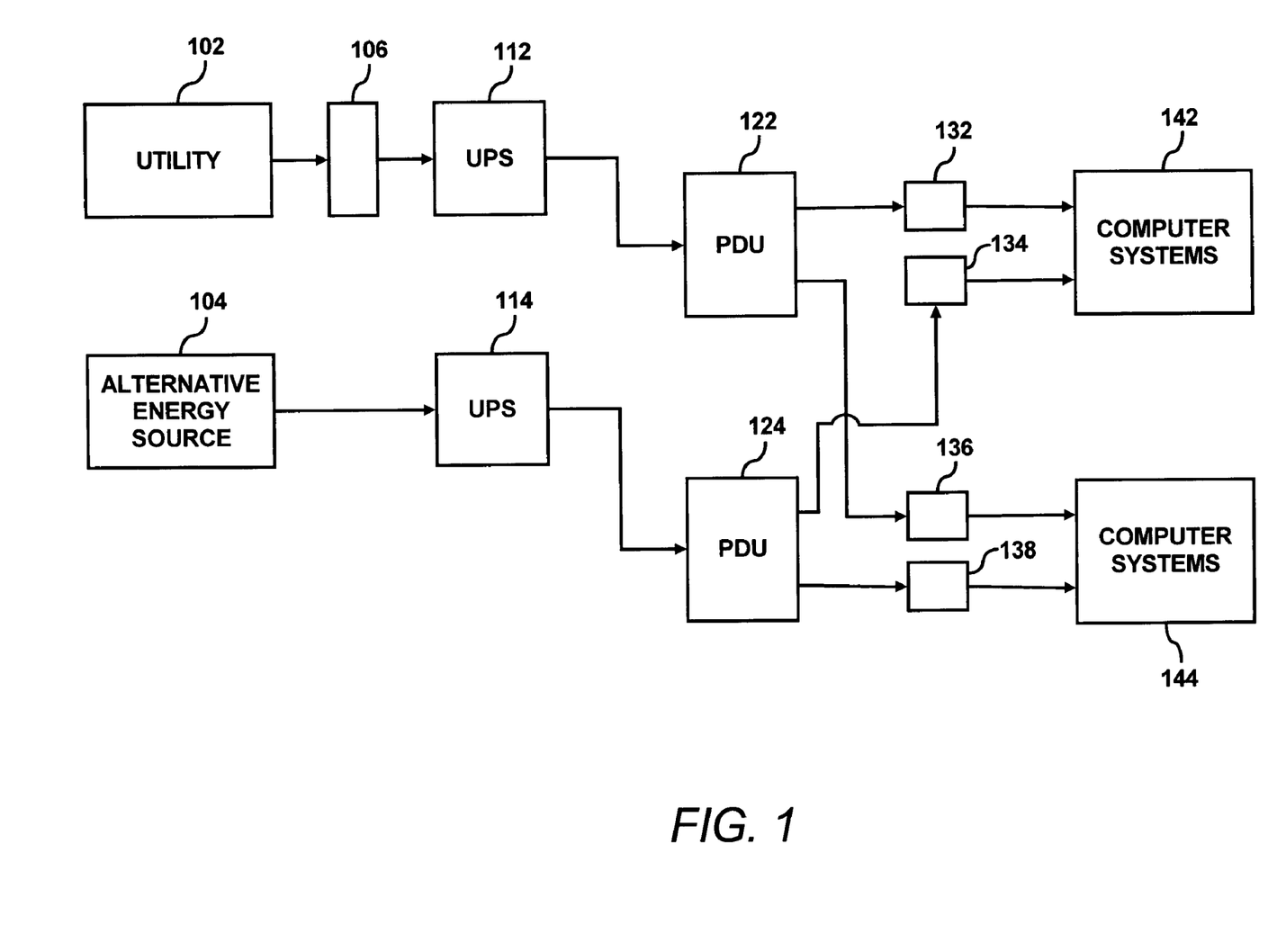
FIG. 1 illustrates a block diagram of a power system, according to an embodiment of the invention.

FIG. 1 illustrates a block diagram of a power system 100, according to an embodiment of the invention. The power system 100 comprises a power utility 102 supplying unconditioned power to loads. The power utility, for example, may make 12 to 16 Mega Watts (MW) available to a particular load, such as several computer systems. The power utility 102 is connected to a power distribution system 106, which may include power lines, switches, transformers, etc. for distributing and conditioning power. The power distribution system 106 may be connected to an uninterruptible power source (UPS) 112, which may provide uninterrupted power for a predetermined period of time to a load. For example, an 8 MW UPS 112 may be connected to one or more generators and/or batteries to provide power for a limited or substantially indefinite period of time in response to a failure, such as an interruption in received power from the power distribution system 106. The UPS 112 is connected to a PDU 122, which supplies power to the power supplies 132 and 136. The PDU 122 may include AC/AC power supplies etc. to step down voltage of output power supplied to the power supplies 132 and 136. The PDU 122 may be connected to several other power supplies, not shown, and may include circuit breakers, power failure alarms, etc. The power supplies 132 and 136 supply power to the computer systems 142 and 144. The computer systems 142 may include a single computer system, such as a standalone server or personal computer, or multiple computer systems receiving power from the power supplies 132 and 134. Similarly, the computer systems 144 may include one or more computer systems. Each of the computer systems may also include their own power supply, for example, generating low voltage, power output (e.g., 12 V, 5 V, 3 V, etc.). The power supplies 132-138 may include AC/DC conversion, and the like. In one embodiment, one or more of the power supplies 132-138 may have the efficiency curve and the power factor curve, shown in FIGS. 6 and 7 respectively. In other embodiments, the power supplies 132 138 may be designed to produce much higher or much lower output power, other than shown in FIG. 6, depending on the load being serviced by the power supplies 132-138. The power supplies 132-138 may include power supplies in a rack or cabinet primarily supplying power to servers, and other electrical devices housed in the rack. In this instance, the power supplies 132-138 may be responsible for providing at least 10 kW of power for up to 40 components in a rack or cabinet. The power supplies 132-138 may include power supplies in one or more computer systems, such as for a "white box" server, a box of blades, personal computer, etc. The power supplies 132-138 are not limited to providing power for computer systems, and may supply power to any electrical device, including cooling systems, mass storage devices, switches, alarm systems, etc.

The system 100 may also include an alternative energy source 104. The alternative energy source 104 may include fuel cells, wind power, solar power, etc. The alternative energy source is connected to a UPS 114, which provides uninterrupted power, at least for a predetermined period of time, to the PDU 124. The PDU 124 conditions the power and distributes power to the power supplies 134 and 138, which supply power to the computer systems 142 and 144. Although not shown, the alternative energy source 104 may distribute power via a power distribution system, similarly to the power distribution system 106, if necessary (e.g., when the alternative energy source 104 produces substantially unconditioned power similarly to the power utility 102 and/or is located a substantial distance from the UPS 114). Also, the alternative energy source 104 may be directly connected to the PDU 124 or the power sources 134 and 138, especially with respect to using fuel cells as the alternative energy source 104. In addition, the alternative energy source 104 may be connected to the PDU 122. However, full redundancy is achieved by connected the alternative energy source 104 to the computer systems 142 and 144 via the separate UPS 114 and PDU 124.

In one embodiment, the UPS 112 and 114, the PDUs 122 and 124, the power supplies 132-138, and the computer systems 142 and 144 may be housed in a data center. The data center may contract with the power utility 102 to receive a predetermined amount of power (e.g., up to 16 MW), and the power is distributed via the components shown in FIG. 1 to the computer systems 142 and 144. Alternative energy sources 104, such as wind and solar, may be provided by a utility company or may be connected directly to the data center. For example, solar panels or windmills may be directly connected to the data center via power conditioning equipment (not shown) to provide clean power to the data center at a predetermined voltage. Also, fuel cells (not shown) may be connected to the alternative energy source 104 for storing power when the alternative energy source is unavailable. These fuel cells can supply power to the power supplies 134 and 138 when needed.

According to an embodiment of the invention, the power supplies 132 and 136 are the primary power supplies for the computer systems 142 and 144, respectively. The power supply 132 is substantially maintained at its efficient operating point when providing power for the one or more computer systems 142. Similarly, the power supply 136 is substantially maintained at its efficient operating point when providing power for the one or more computer systems 144.

The power supplies 134 and 138 are generally secondary power supplies for the computer systems 142 and 144, respectively. When the power demand of the computer systems 142 and/or 144 is high, the power supplies 132 and 136 may not be able to operate at their most efficient operating points to meet the high power demand of the computer systems 142 and 144. The secondary power supplies 134 and 138 partially supply power to the computer systems 142 and 144 to allow the primary power supplies to continue to operate at their most efficient operating point. For example, the load on the power supply 134 may be approximately equal to an amount of power exceeding the amount of power output by the power supply 132 when operating at its efficient operating point and needed to meet the power demand of the computer systems 142. The secondary power supplies 134 and 138 are shown as receiving power from the alternative energy source 104. However, the power system 100 may be designed such that the secondary power supplies 134 and 138 may also be connected to the utility 102 via UPS 112 and PDU 122 or via a different PDU (e.g., the PDU 124 if connected to the utility 102) and/or a different UPS (e.g., the UPS 114 if connected to the utility 102).

The primary power supplies 132 and 136 may have different characteristics than the secondary power supplies 134 and 138. For example, the secondary power supplies 134 and 138 may have a lower maximum output power, or the secondary power supplies 134 and 138 may be designed to have an efficiency curve that allows the secondary power supplies 134 and 138 to operate at their efficient operating points while sharing the load with the primary power supplies 132 and 136.

Figure 2:
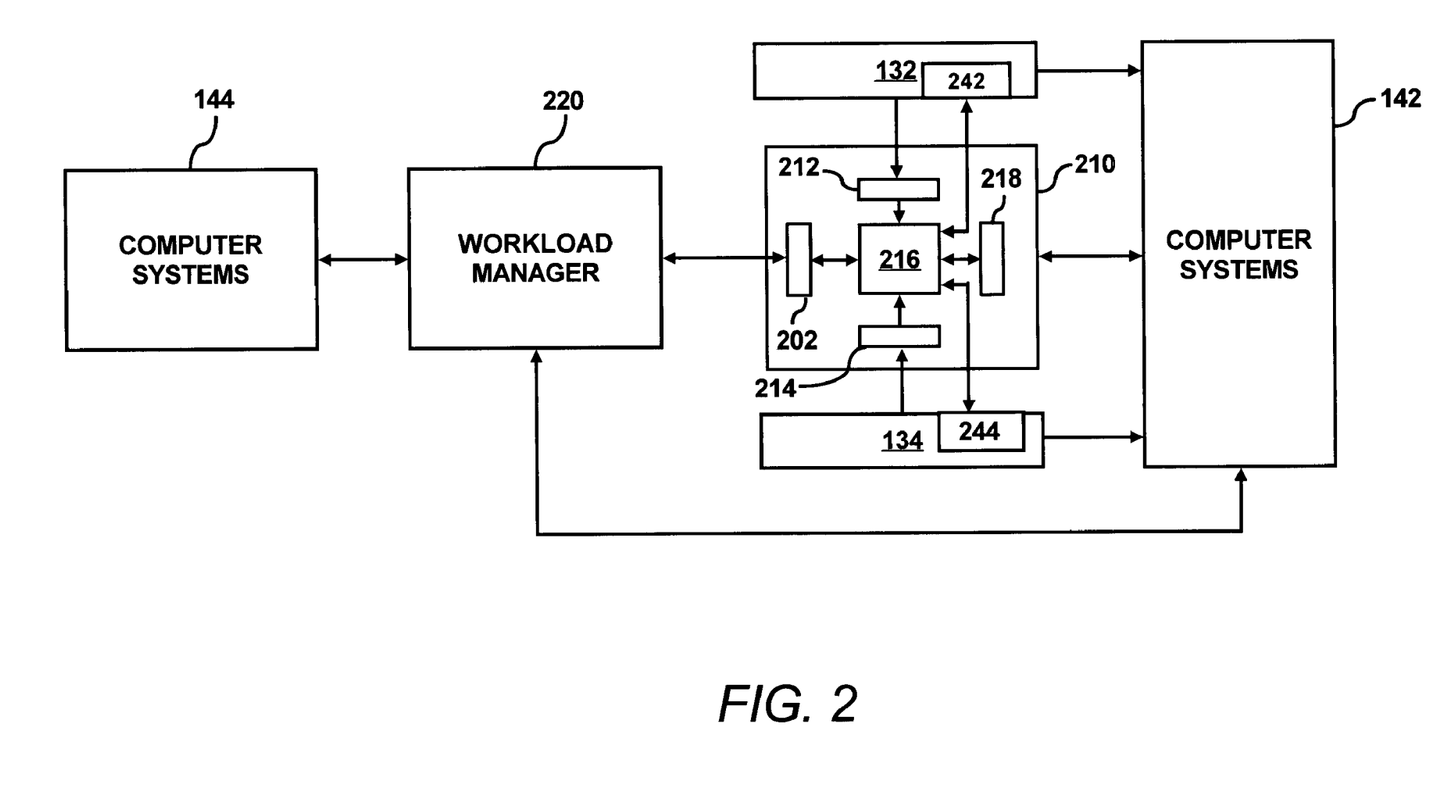
FIG. 2 illustrates a block diagram of a power control system, according to an embodiment of the invention.

FIG. 2 illustrates a power control system 200 operable to control the load on the power supplies, according to an embodiment of the invention. FIG. 2 illustrates a power delivery device 210 connected to the power supplies 132 and 134. The power delivery device 210 controls the load of each of the power supplies 132 and 134, such that the primary power supply 132 may substantially operate at it efficient operating point.

The power delivery device 210 measures the output power of the primary power supply 132 and compares the output power to a threshold associated with the efficient operating point of the primary power supply 132. The power delivery device 210 may also calculate the power factor of the primary power supply 132 (e.g., based on the input power to the power supply 132) if the efficient operating point is associated with the power factor of the power supply 132.

If the output power of the primary power supply 132 exceeds the threshold, then the power delivery device 210 determines that the load (i.e., the power demand of the one or more computer systems 142) of the primary power supply 132 should be reduced to allow the primary power supply 132 to operate at its efficient operating point. Then, the power delivery device 210 controls the secondary power supply 134 to supply power to the computer systems 142. The power delivery device 210 calculates the amount of power the secondary power supply 134 needs to supply to the computer systems 142. The amount of power supplied by the secondary power supply 134 is approximately equal to an amount of power exceeding the output power of the primary power supply 132 when operating at its efficient operating point.

If, for example, the power demand of the computer systems 142 decreases, the power delivery device 210 reduces the load on the secondary power supply 134. In some instances, the secondary power supply 134 may be idle if the power demand of the computer systems 142 is sufficiently low that the primary power supply 132 is operating at or below its efficient operating point.

The power delivery device 210 is also operable to increase the power demand of the computer systems 142 if, for example, the output power of the primary power supply 132 is below the threshold and the secondary power supply is off. For example, a workload manager 220 may be connected to the computer systems 142 and 144. The workload manager 220 monitors and stores the workload of the computer systems 142 and 144. The workload manager 220 may instruct the computer systems 142 and 144 to execute or stop executing applications to increase or decrease power consumption of a respective computer system. If, for example, the workload of the computer systems 142 is low, then one or more applications may be migrated from the computer systems 144 to the computer systems 142. The power delivery device 210 may transmit a request to the workload manager 220, for example, to increase the workload of the computer systems 142 if the primary power supply 132 is operating below its efficient operating point (e.g., the power output of the primary power supply 132 is below the threshold). The workload manager 220 may migrate one or more applications from the computer systems 144 to the computer systems 142. For example, one or more applications scheduled to execute on the computer systems 144 are executed by the computer systems 142. Therefore, the power consumption of the computer system 142 increases, and the primary power source 132 increases its power output, preferably, to at least the efficient operating point.

According to another embodiment, the power delivery device 210 may also transmit a request to the workload manager 220 to reduce the workload of the computer systems 142. In some instances, the power demand of the computer systems 142 may exceed the output power of the primary power supply 132 operating at the efficient operating point and the output power of the secondary power supply 134, for example, operating above an efficient operating point or near a maximum output power capacity. In these instances, when the excessive power demand is sustained for a predetermined period of time, the power delivery device 210 requests the workload manager 220 to reduce the workload of the computer systems 142 to another computer system (e.g., the computer systems 144).

The workload manager 220 may migrate some of the workload to one of the computer systems 144 receiving power from one or more other power supplies (e.g., the power supplies 136 and 138). Therefore, the power demand of the computer systems 142 is reduced. Also, the workload manager 220 may migrate workload from one of the computer systems 142 to another one of the computer systems 142, which may be more efficient with a heavier workload. For example, if one of the computer systems 142 is operating at 55% efficiency and increasing the workload for that computer system increases the efficiency to approximately 80%, then the workload is migrated to that computer system.

In yet another embodiment, the power delivery device 210 may allocate load for the power systems 132 and 134 based on energy costs. For example, if the cost of power from the utility 102, shown in FIG. 1, is substantially higher than the cost of power from the alternative energy source 104, shown in FIG. 1, then the power delivery device 210 allocates more load to the power supply 134 instead of the power supply 132.

The workload manager 220 may monitor the workload of the computer systems 142 and 144. This may be accomplished by monitoring the workload as it enters the system and is assigned to a particular computer system. The workload manager 220 may index the workload of each of the computer systems 142 and 144. Based on information pertaining to the workload of each of the computer systems 142 and 144 (e.g., historical power consumption vs. workload measurements), the workload manager 220 may increase or decrease a workload for a computer system accordingly.

The power delivery device 210 may include conventional power measuring circuits 212 and 214 for measuring the load on the power supplies 132 and 134. Also, the power delivery device 210 may include a controller 216 or the like and memory 218 for storing and executing software to control the power output by the power supplies 132 and 134. Also, the power delivery device 210 may include a network interface 202 for communicating with the workload manager 220. A similar power delivery device may be used for the power supplies 136 and 138.

Generally, the power measuring circuits 212 and 214 are provided to measure the power consumption of the load, such as the computer systems 142 and 144. In one embodiment, the power measuring circuits 212 and 214 measure the output power of the power supplies 132 and 134 to determine the power consumption of the load. In another embodiment, instead of measuring the output power of the power supplies 132 and 134, power consumption may be determined by distributing power measuring circuits throughout the system 200 to determine the power consumption. For example, power measuring circuits may be connected to each power bus connected to the computer systems. Other conventional techniques may also be used to determine power consumption of the computer systems 142 and 144. In addition, the power measuring circuits 212 and 214 may comprise temperature sensors measuring the heat dissipation of the primary power supply 132 and the secondary power supply 134. The heat dissipated by a power supply is relative to the load on the power supply and the efficiency of the power supply, such as shown in FIG. 5. Therefore, a table or index may be generated comprising measured heat dissipation, efficiency and/or load. The table may be stored in the memory 218. This table may be used to determine the output power of the primary power supply 132 and the secondary power supply 134 or the efficiency of the power supplies.

Based on the load for each of the power supplies 132 and 134, the controller 216 may control the power supplies 132 and 134 to increase or decrease their output power. For example, the controller 216 may be connected to power output control circuits 242 and 244 provided in or connected to respective power supplies 132 and 134. Conventionally, power output control circuits have been used to control the power output of power supplies to share the load equally. These conventional circuits may be used to control the output power of the power supplies 132 and 134 according to the embodiments of the invention.

Figure 3:
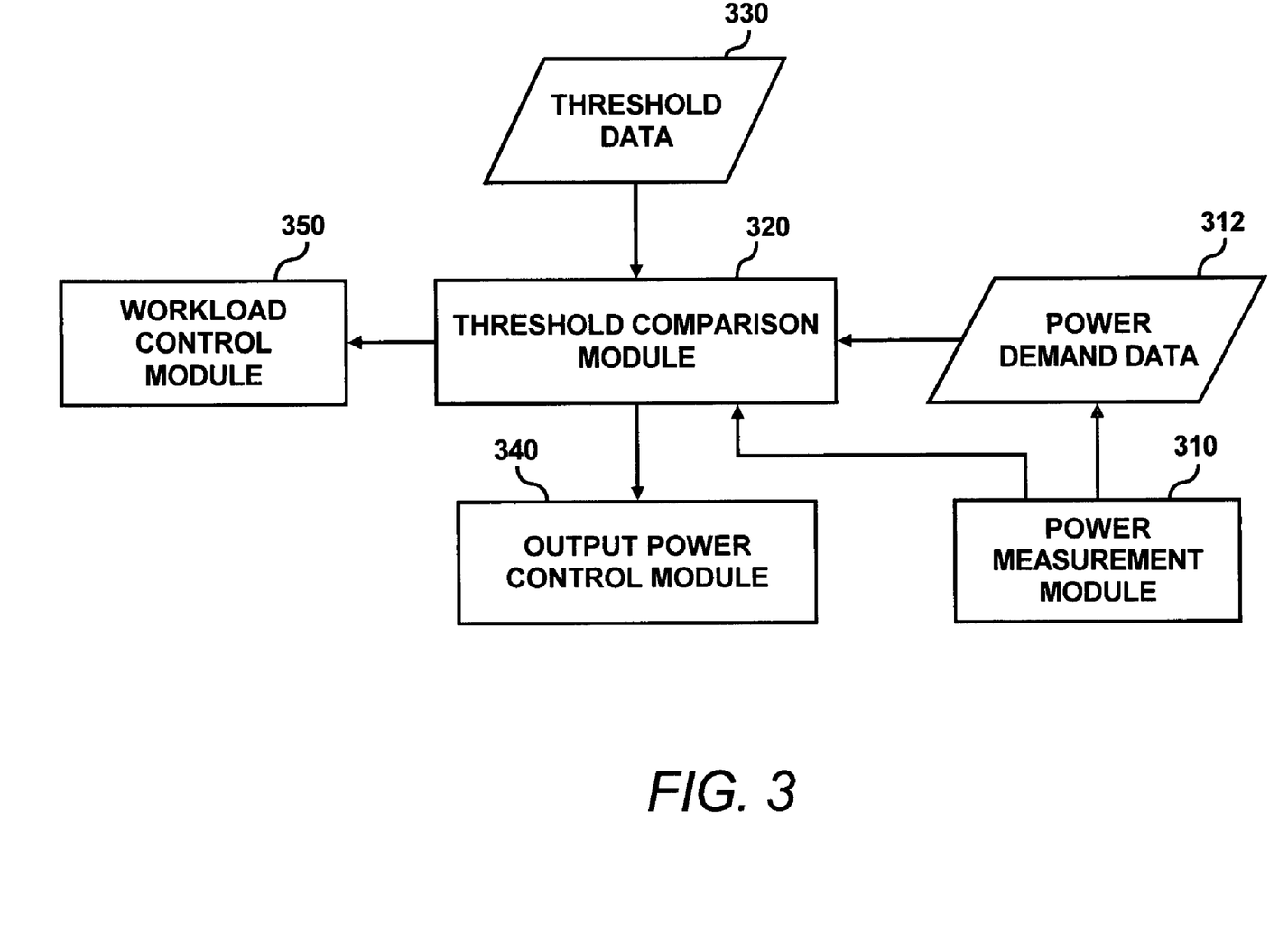
FIG. 3 illustrates a software architecture of a power control device, according to an embodiment of the invention.

FIG. 3 illustrates an exemplary software architecture 300 for the power delivery device 210 shown in FIG. 2, according to an embodiment of the invention. It should be readily apparent to those of ordinary skill in the art that the architecture 300 represents a generalized schematic illustration and that other components may be added or existing components may be removed or modified. Moreover, the architecture 300 may be implemented using software components, hardware components, or a combination thereof. Also, the modules of the software architecture 300 may be executed by a controller, ASIC, or other hardware.

The software architecture 300 comprises a power measurement module 310, a threshold comparison module 320, a power output control module 340 and a workload control module 350. The power measurement module 310 measures the power demand of the computer systems 142. For example, the power demand may be measured by the power measurement circuits 212 and 214 shown in FIG. 2, which are connected to the power supplies 132 and 134. The power measurement module 310 receives measurements of the power output of the power supplies 132 and 134 to determine the power demand of the computer systems 142. These measurements may be stored in the memory 218, shown in FIG. 2, as the power demand data 312.

The threshold comparison module 320 compares the power demand data 312 to a threshold to determine whether the load on the primary power supply 132 should be increased or decreased (e.g., sharing the load with the secondary power supply 134) to operate the primary power supply at its efficient operating point. The threshold is associated with the efficient operating point of the primary power supply 132. The threshold may include a power factor threshold and/or an output power threshold. The threshold may be stored in the memory 212, shown in FIG. 2, as the threshold data 212.

The threshold may include an upper threshold and a lower threshold. For example, if the upper threshold is exceeded, the secondary power supply 134 will share the load with the primary power supply 132 to allow the primary power supply to operate at its efficient operating point. If the power consumption of the load falls below a second threshold, the secondary power supply 134 may reduce its output power or stop supplying power depending on how low the power consumption falls. The difference between the upper and lower threshold provides a buffer that substantially prevents the secondary power supply 134 from continually switching on and off or continually changing its output power.

When using a power factor for the threshold, power factor data (e.g., calculated from the input power of the power supplies 132 and 134), which may also be stored as the power demand data 312, is compared to the power factor threshold by the threshold comparison module 320. If the calculated power factor is below the power factor threshold, then the output power of the primary power supply 132 may be increased to achieve its efficient operating point. An upper and lower power factor threshold may also be used.

The threshold data 330 may include one or more output power values. For example, the threshold may include an output power value or range of output power values for the primary power supply 132 operating at its efficient operating point. If the power demand of the computer systems 142 exceeds the threshold, then the load on the primary power supply 132 is reduced until the primary power supply 132 is able to operate at its efficient operating point. The load on the secondary power supply 134 is increased substantially by the same amount the load on the primary power supply is decreased.

The threshold data 330 may also be associated with energy costs. For example, a threshold may be used to limit the output power of the primary power supply 132 if the cost of electricity (e.g., generated at the utility 102 shown in FIG. 1) is relatively high when compared to the cost of electricity from the alternative energy source 104, shown in FIG. 1. Then, the load of the computer systems 142 is substantially shifted to the secondary power supply 134 using the output power control module 340.

The threshold data 330 may be input, for example, by a system administrator or calculated based on data input by a system administrator (not shown). For example, a system administrator may input efficiency curve data, power factor curve data, and/or energy costs. Then, one or more algorithms may be used to calculate the threshold. Alternatively, the system administrator may pre-calculate the threshold data 330 and input the data to the power delivery device 210. The threshold data 330, for example, may be entered at a system administrator console (not shown) and transmitted to the power delivery device 210 via a network.

The threshold comparison module 320 invokes the output power control module 340 to control the output power of the power supplies 132 and 134. For example, if the threshold comparison module 320 determines that a threshold associated with the output power of the primary power supply 132 operating at its efficient operating point is exceeded, the threshold comparison module 320 invokes the output power control module 340 to decrease the load of the primary power supply 132 and increase the load of secondary power supply 134. The output power control module 340 may be connected to circuitry in the power supplies 132 and 134 that is operable to control the output power of the power supplies 132 and 134.

The threshold comparison module 320 may also invoke the workload control module 350 to request a change in workload from the workload manager 220, shown in FIG. 2. For example, if the power demand of the computer systems 142 exceeds the threshold for a sustained, predetermined period of time, then the workload control module 350 may generate a message requesting that the workload manager 220 migrate some of the workload of the computer systems 142 to another computer system to reduce the load of the power supply 132. The workload manager 220 may migrate some of the workload of the computer systems 142 to the computer systems 144 to reduce the workload. Also, the workload manager 220 may migrate some of the workload to a more efficient computer system also receiving power from the power supplies 132 and 134.

Figure 4:
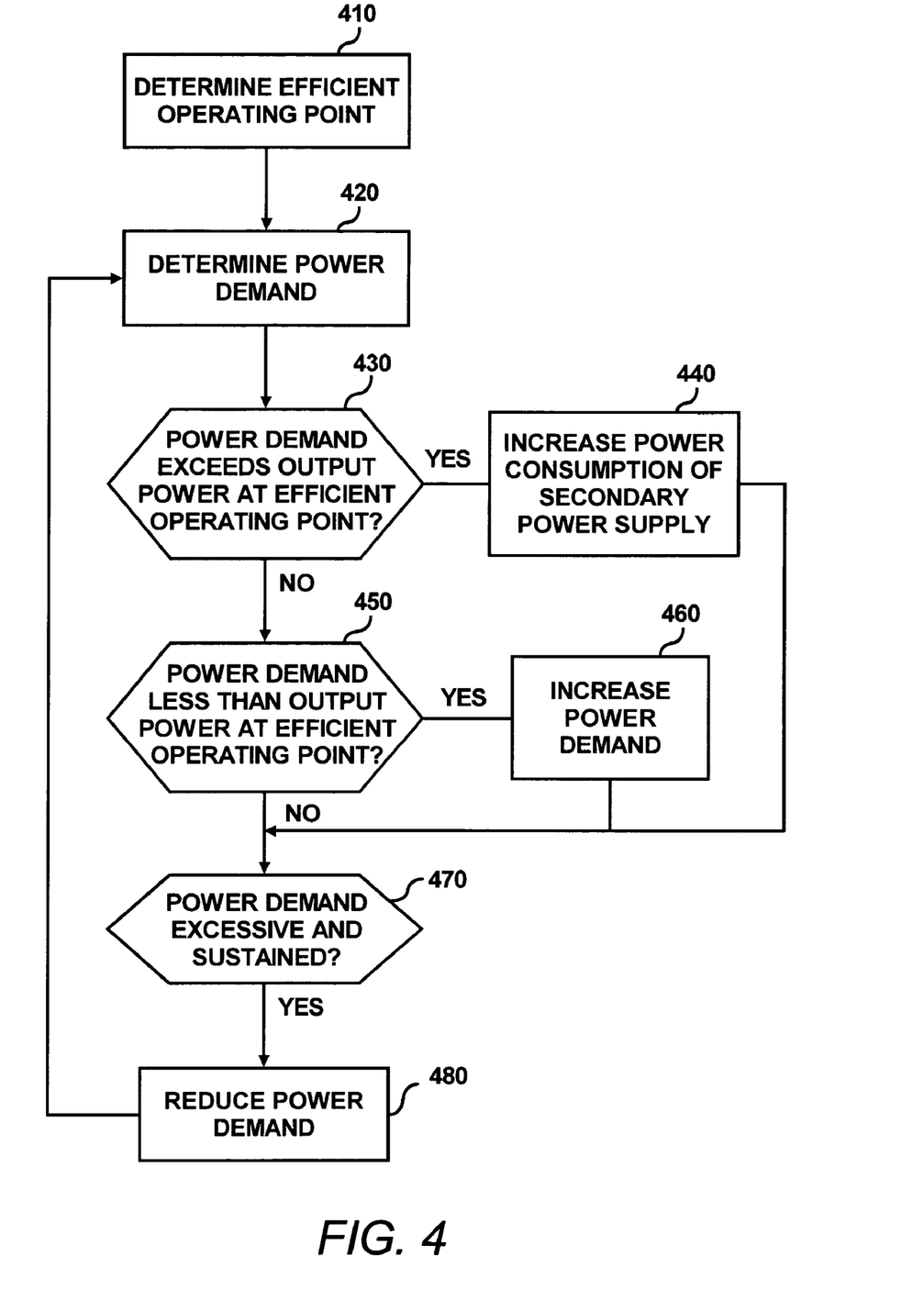
FIG. 4 illustrates a flow chart of a method for controlling power output of at least two power supplies, according to an embodiment of the invention.

FIG. 4 illustrates a method 400 for controlling the output power of at least two power supplies, according to an embodiment of the invention. The steps of the method 400 are described with respect to the system 200 shown in FIG. 2 by way of example and not limitation. Furthermore, the steps of the method 400 may be performed by software, hardware or a combination thereof.

At step 410, the power delivery device 210 determines an efficient operating point for the primary power supply 132. The efficient operating point may be based on one or more of an efficiency curve and/or a power factor curve for the primary power supply 132. Also, the efficient operating point may further be based on the efficient operating point of power-related components upstream from the primary power supply 132 (e.g., the efficiency of the PDU 122 and/or the UPS 112 shown in FIG. 1). In another embodiment, the efficient operating point of the primary power supply 132 may be based on energy costs. For example, an electricity cost-based algorithm may be used to calculate an efficient operating point for the primary power supply 132 based on the cost of electricity provided from the utility 102 and the alternative energy source 104 (shown in FIG. 1). For example, if the cost of electricity from the utility 102 is high relative to the cost of electricity from the alternative energy source 104, then the efficient operating point of the primary power supply 132 is set such that the majority of the power demand of the computer systems 142 is met by the cheaper power source (e.g., from the alternative energy source 104 via the secondary power supply 134).

At step 420, the power delivery device 210 determines a power demand of the computer systems 142. The computer systems 142 may include one or more electrical devices, which may include one or more computer systems, mass storage devices, cooling systems, alarm systems, etc. The power demand may be determined by measuring the output power of at least two power supplies (e.g., the primary power supply 132 and the secondary power supply 134) operable to supply power to meet the power demand of the computer systems 142.

At step 430, the power delivery device 210 determines whether the power demand of the computer systems 142 exceeds the output power of the primary power supply 132, operating at its efficient operating point. If the power demand exceeds the output power of the primary power supply 132, then the secondary power supply 134 increases its output power to the computer systems 142 (step 440). For example, the power delivery device 210 increases the load on the secondary power supply 132 approximately by the amount the power demand of the computer systems 142 exceeds the output power of the primary power supply 132 operating at its efficient operating point.

At step 450, the power delivery device 210 determines whether the power demand of the computer systems 142 is less than the output power of the primary power supply 132 operating at its efficient operating point. If the power demand is less than the output power, then the power demand of the computer systems 142 is increased (step 460). For example, the power delivery device 210 may request the workload manager 220 to increase the workload of the computer systems 142. The workload manager 220 may migrate one or more applications to the computer systems 142, thereby increasing the power demand of the computer systems 142.

At steps 430 and 450, an upper threshold and a lower threshold may be used for the efficient operating point of the primary power supply 132. For example, referring to the efficiency curve of FIG. 6, the power supply (e.g., the primary power supply 132) is most efficient approximately between 450 W and 500 W of output power. At step 440, the power demand of the computer systems 142 may be compared to 500 W to determine whether the power demand exceeds the efficient operating point of the primary power supply 132. At step 450, the power demand may be compared to 450 W to determine whether the power demand is less than the efficient operating point. Also, the upper and lower thresholds may be used to prevent the power delivery device 210 from continuously adjusting the load of the power supplies 132 and 134. For example, the upper threshold may include a buffer which is a predetermined amount (e.g., 20 W) above the output power of the primary power supply 132 operating at its efficient operating point. A similar buffer may be used for the lower threshold.

The threshold has generally been described as an amount of power and/or a power factor. The threshold may also be a power consumption rate of the load. For example, if the rate of power consumption exceeds a predetermined value, the secondary power supply may share the load with the primary power supply. Also, power consumption rate may be used in combination with a power value and/or a power factor value for the threshold. For example, if the rate of power consumption is above a predetermined threshold, and power consumption is above a predetermined value, then the secondary power supply may share the load.

At step 470, the power delivery device 210 determines whether the power demand of the computer systems 142 is excessive (e.g., greater than a predetermined threshold) and sustained. Excessive power demand may include power demand that exceeds the output power of the primary power supply 132 operating at its efficient operating point and the output power of the secondary power supply 134 operating at its maximum output power. If the power demand is excessive and the excessive power demand is sustained for a predetermined period of time, the power demand is reduced (step 480). For example, the power delivery device 210 may request the workload manager 220 to migrate some of the workload of the computer systems 142. The workload manager 220 may migrate some of the workload to the computer systems 144 (receiving power from different power supplies 136 and 138) or to a more efficient computer system of the computer systems 142.

One or more of the steps, such as the steps 420-480, of the method 400 may be repeated (e.g., substantially continuously repeated or periodically repeated) or demand driven. The step 410 of determining efficient operating point may be repeated, for example, when new operating efficiency data (e.g., new efficiency curve, new power factor curve, new energy cost information, etc.) is received. Also, one or more steps of the method 400 may be performed in a different order. For example, step 420 may be performed before step 410. Also, the steps 430 and 450 may be performed in a different order. These and other variations to the method 400 will be apparent to one of ordinary skill in the art.

What has been described and illustrated herein are embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. A method of supplying power to at least one electrical device, the method comprising:
   determining a power demand of the at least one electrical device;
   determining an efficient operating point for a primary power supply supplying power to the at least one electrical device;
   supplying power to meet the power demand of the at least one electrical device using one or more of the primary power supply operating at the efficient operating point and a secondary power supply based on whether the primary power supply operating at the efficient operating point is operable to meet the power demand of the at least one electrical device;
   determining whether the power demand of the at least one electrical device substantially exceeds a combined output power for the primary power supply and the secondary power supply for a predetermined period of time; and
   reducing the power demand of the at least one electrical device in response to determining the power demand of the at least one electrical device substantially exceeds the combined output power for a predetermined period of time, wherein reducing the power demand of the at least one electrical device comprises migrating workload from the at least one electrical device to another electrical device operable to receive one of a) power from the primary power supply and the secondary power supply, and b) power from a power supply other than the primary power supply and the secondary power supply; and wherein the another electrical device operating more efficiently with the migrated workload.

2. The method of claim 1, wherein supplying power to meet the power demand of the at least one electrical device comprises:
   determining whether the power demand of the at least one electrical device exceeds an output power of the primary power supply operating at the efficient operating point; and
   supplying power to the at least one electrical device using the primary and secondary power supply in response to determining the power demand of the at least one electrical device exceeds the output power of the primary power supply operating at the efficient operating point.

3. The method of claim 2, wherein supplying power to the at least one electrical device comprises the secondary power supply supplying an amount of power substantially equal to the power demand of the at least one electrical device that exceeds the output power of the primary power supply operating at the efficient operating point.

4. The method of claim 2, wherein determining whether the power demand of the at least one electrical device exceeds an output power of the primary power supply operating at the efficient operating point comprises determining whether the power demand of the at least one electrical device exceeds a range of output powers associated with the efficient operating point.

5. The method of claim 1, further comprising:
   determining whether the power demand of the at least one electrical device exceeds an upper threshold or is less than a lower threshold; and
   varying an output power of one or more of the primary power supply and the secondary power supply in response to the power demand exceeding the upper threshold or the power demand being less than the lower threshold.

6. The method of claim 1, wherein determining a power demand of the at least one electrical device comprises one or more of measuring the output power of the primary power supply and the secondary power supply and measuring hear dissipation of the primary power supply and the secondary power supply.

7. The method of claim 1, wherein determining an efficient operating point for the primary power supply comprises determining an efficient operating point for the primary power supply based on one or more of a power factor and efficiency of the primary power supply operating at different output powers.

8. The method of claim 7, wherein determining an efficient operating point for the primary power supply further comprises determining an efficient operating point for the primary power supply additionally based on an efficiency of at least one power system component upstream from the primary power supply.

9. The method of claim 8, wherein the at least one component upstream comprises a power distribution unit, an uninterruptible power source, and a power distribution system.

10. The method of claim 1, wherein determining an efficient operating point for the primary power supply comprises determining an efficient operating point based on a cost of electricity from each of at least two different sources.

11. The method of claim 1, further comprising:
determining whether the power demand of the at least one electrical device is less than an output power of the primary power supply operating at the efficient operating point; and
increasing the power demand of the at least one electrical device in response to the power demand being less than the output power of the primary power supply operating at the efficient operating point.

12. The method of claim 11, wherein an upper and lower threshold are associated with the efficient operating point, and determining whether the power demand of the at least one electrical device is less than the output power of the primary power supply operating at the efficient operating point comprises determining whether the power demand of the at least one electrical device is less than the lower threshold.

13. The method of claim 11, wherein increasing the power demand of the at least one electrical device comprises migrating workload to the at least one electrical device from another electrical device.

14. The method of claim 1, wherein supplying power to meet the power demand of the at least one electrical device comprises supplying power using only the primary power supply in response to determining the power demand of the at least one electrical device is approximately equal to or less than the output power of the primary power supply operating at the efficient operating point.

15. The method of claim 1, wherein the at least one electrical device comprises one or more of at least one computer system, a cooling system, a mass storage device, and an alarm system.

16. A power system comprising:
a first power supply and a second power supply operable to supply power to at least one electrical device;
a power delivery control device connected to the first power supply and the second power supply, wherein the power delivery control device substantially maintains the first power supply at an efficient operating point by controlling an output power of the first power supply and an output power of the second power supply to meet the power demand of the at least one electrical device; and
a workload manager controlling the workload of the at least one electrical device and other electrical devices, wherein the power delivery control device is operable to request the workload manager to migrate workload to the at least one electrical device from at least one of the other electrical devices in response to the power demand of the at least one electrical device falling below the output power of the first power supply operating at the efficient operating point; and
wherein the power delivery control device is operable to request the workload manager to migrate workload from the at least one electrical device to at least one of the other electrical devices in response to the power demand of the at least one electrical device exceeding the output power of the first power supply operating at the efficient operating point for a predetermined period of time.

17. The power system of claim 16, wherein the efficient operating point of the first power supply is based on one or more output powers for the first power supply where the first power supply is substantially most efficient in generating output power from an input power.

18. The power system of claim 17, wherein the one or more output powers where the first power supply is substantially most efficient are determined from one or more of a power factor curve and a efficiency curve for the first power supply.

19. The power system of claim 16, wherein the power delivery control device is operable to increase the output power of the second power supply in response to the power demand of the at least one electrical device exceeding the output power of the first power supply operating at the efficient operating point.

20. The power system of claim 16, wherein the first power supply is operable to receive power generated from a first power source and the second power supply is operable to receive power generated from a second power source, and the efficient operating point of the first power supply is based on a cost of electricity generated from the first power source and a cost of electricity generated from the second power source.

21. The power system of claim 20, wherein the power delivery control device is operable to increase the load on the first power supply in response to the cost of electricity from the first power source being less than the cost of electricity from the second power source, and the power delivery control device is operable to increase the load on the second power supply in response to the cost of electricity from the second power source being less than the cost of electricity from the first power source.

22. The power system of claim 16, wherein the at least one electrical device comprises one or more computer systems.

23. The power system of claim 22, wherein the computer systems are housed in an enclosure in a data center.

24. An apparatus for controlling power output from a first and second power supply based on an efficiency of the first power supply, wherein the first end second power supply provide power to at least one electrical device, the apparatus comprising:
at least one power measuring circuit measuring a power demand of the at least one electrical device;
a memory storing at least one threshold associated with an efficient operating point of the first power supply; and
a circuit controlling an output power of the first power supply to substantially maintain the first power supply at the efficient operating point based on a comparison of the power demand of the at least one electrical device to the at least one threshold;
wherein the first power supply is operable to receive power generated from a first power source and the second power supply is operable to receive power generated from a second power source, and the efficient operating point of the first power supply is based on a cost of electricity generated from the first power source and a cost of electricity generated from the second power source; and
wherein the circuit is operable to increase the load on the first power supply in response to the cost of electricity from the first power source being less than the cost of electricity from the second power source, and the power delivery control device is operable to increase the load on the second power supply in response to the cost of electricity from the second power source being less than the cost of electricity from the first power source.

25. The apparatus of claim 24, wherein the circuit increases an output power of the second power supply and substantially maintains the first power supply at the efficient operating point to meet the power demand of the at least one electrical device in response to the power demand of the at least one electrical device exceeding the at least one threshold.

26. The apparatus of claim 22, further comprising an interface connected to a workload manager, wherein the circuit is operable to request the workload manager to increase or decrease a workload of the at least one electrical device to substantially maintain the first power supply at the efficient operating point.

27. The apparatus of claim 24, wherein the at least one power measuring circuit measures an output power of the first power supply and the second power supply to determine the power demand of the at least one electrical device.

* * * * *

UNITED STATES PATENT AND TRADEMARK OFFICE
CERTIFICATE OF CORRECTION

PATENT NO. : 7,269,751 B2
APPLICATION NO. : 10/628291
DATED : September 11, 2007
INVENTOR(S) : Gopalakrishnan Janakiraman et al.

It is certified that error appears in the above-identified patent and that said Letters Patent is hereby corrected as shown below:

In column 6, line 17, delete "132 138" and insert -- 132-138 --, therefor.

In column 14, line 53, in Claim 6, delete "hear" and insert -- heat --, therefor.

In column 16, line 45, in Claim 24, delete "end" and insert -- and --, therefor.

Signed and Sealed this

Twenty-third Day of June, 2009

JOHN DOLL
*Acting Director of the United States Patent and Trademark Office*